April 17, 1934. M. FRÄNKL Re. 19,140

METALLIC FILLING FOR COLD ACCUMULATORS

Original Filed July 21, 1928

INVENTOR
MATHIAS FRÄNKL
BY
Watson, Bristol, Johnson & Leavenworth
ATTORNEYS

Reissued Apr. 17, 1934

Re. 19,140

UNITED STATES PATENT OFFICE 19,140

METALLIC FILLING FOR COLD ACCUMULATORS

Mathias Fränkl, Augsburg, Germany, assignor to American Oxythermic Corporation, New York, N. Y., a corporation of Delaware Original No. 1,808,921, dated June 9, 1931, Serial No. 294,356, July 21, 1928. Application for reissue May 9, 1933, Serial No. 670,086. In Germany August 1, 1927

13 Claims. (Cl. 25.7—6)

The object of the present invention is to provide a cold accumulator suitable for use in the process described in patent application Serial No. 81,723, granted as Patent 1,890,646, Process for separation of gas mixtures, especially of air, in which the exchange of cold is effected by means of regenerators arranged for reversed operation. The cold accumulator used in this process consists of a cylindrical or square shell of sheet metal through which the air or other gaseous mixture flows in axial direction between a number of strips of sheet metal disposed inside the shell at a distance of from 0.5 to 2.5 mm. apart from one another, whereby an exchange of cold or heat is effected.

As the specific heat of iron at very low temperatures is considerably less than at atmospheric temperature and as the volume of a gas decreases with lowering temperature, while the specific heat of a gas remains fairly even, a form of filling for the cold accumulator had to be devised which takes these facts into account. Inside the cold accumulators the temperature decreases from top to bottom, also the volume of gas and the specific heat of the iron filling of the accumulator decrease. This latter at minus 190° C. amounts only to 0.036 as compared to 0.11 at plus 20° C., that is two thirds less. The volume of gas decreases at about the same rate. The filling must, therefore, be so constituted that its mass towards the bottom or cold zone of the accumulator is greater than at the top or warmer zone and, therefore, the total flow area for the gas diminishes toward the colder end.

In the accompanying drawings, which show a preferred embodiment of the apparatus according to the invention, Fig. 1 is a front view of a cold accumulator with parts of the shell removed to show the filling, e. g., strips of sheet metal;

Figure 1:
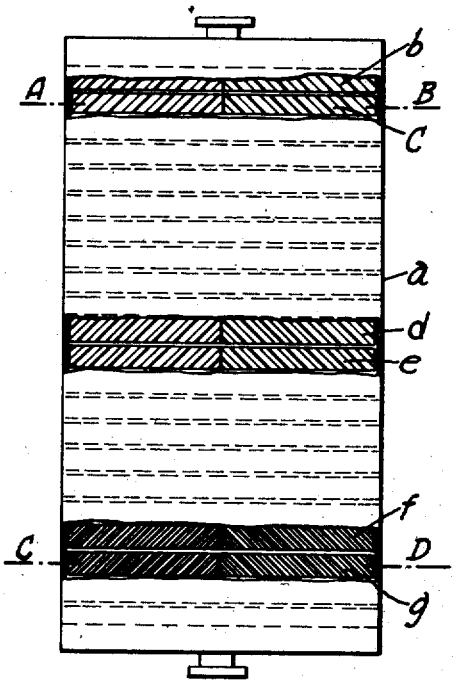
Figure 3:
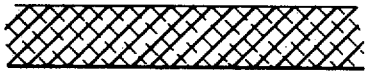
Fig. 3 is a side view of two sheet metal strips, one behind the other, the one in front being drawn in full lines, the rear one in dotted lines.
Figure 4:
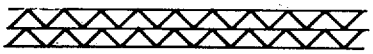
Fig. 4 is a top view of the same.
Figure 5:
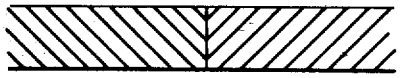
Fig. 5 is a side view of the same; the left side of the figure representing the back strip, the righthand side of the figure the strip lying in front, part of the front strip having been removed.
Figure 2:
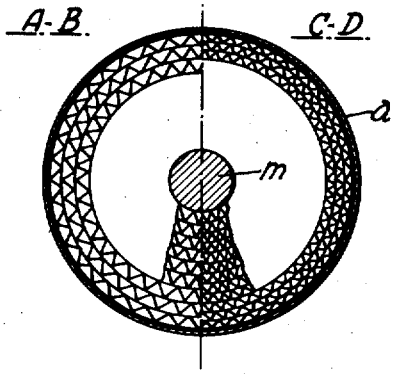
Fig. 2 is a transverse section of the shell, the left side of the figure representing a section along a line A—B of Fig. 1, the right side of a section along a line C—D of Fig. 1.
Figure 6:
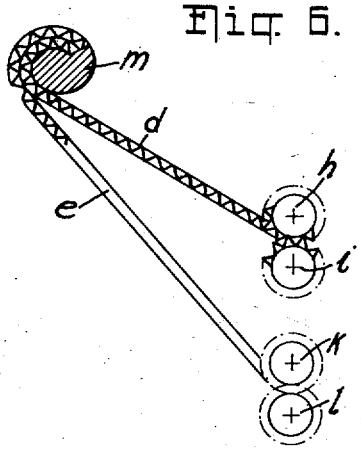
Fig. 6 shows a filling in course of manufacture.

According to this form of the invention strips of sheet metal are disposed inside the shell at distances apart which decrease by steps from top to bottom of the shell, as may be seen from Figs. 1 and 2, resulting in smaller spaces in the lower parts and forming narrower channels or passages appropriate to the diminishing air volume at lower temperatures. The shell "*a*" is shown cut open in three places to expose to view the strips of sheet metal constituting the filling. In cylindrical shells the strips are disposed in spirals forming disks of from 500 to 1500 mm. diameter, as shown in Figs. 2 and 6; in square shells the strips are put in singly, in which case they must be shaped in such a way, that intervening spaces of the desired dimensions result.

To attain the highest possible effect the strips of sheet metal should be corrugated and so arranged that a brisk whirling of the gas, as air flowing through the channels formed by them is brought about. The strips should touch one another only at points, and in no case along a line or plane, because the gas cannot reach places where the strips touch, so that those portions of the cold exchanging surface are thereby rendered ineffective.

With a view to minimize losses from this cause, the strips are provided with corrugations running aslant towards the edges of the strips; by arranging the corrugations of neighboring strips to slant in opposite sense, the strips will touch only at the corrugations which is the desired way, i. e., there will be point contact only. The crossing of the corrugations also causes lively whirls in the gas current, thus considerably increasing the cold exchanging effect.

Fig. 1 shows the shell cut open in three places to expose the filling to view; on the left-hand side the front strip is seen, while at the right is shown the strip which lies behind. The corrugations of the upper strips "*b*" and "*c*" are higher than those of the middle strips "*d*" and "*e*" and of the lowest "*f*" and "*g*", as seen in Figs. 1 and 2.

Fig. 2 shows the filling of a cylindrical cold accumulator in transverse section. In this spirally wound filling two strips with corrugations slanting in opposite sense are always wound simultaneously, thus forming a double-wormed spiral with corrugations lying cross-ways. This is seen very plainly in Fig. 6 which shows the spiral winding in course of manufacture, that is in the unfinished state. The strips "*d*" and "*e*" are preliminarily drawn through pairs of furrowed rollers "*h*" and "*i*", and "*k*" and "*l*", to corrugate them. The strips are laid next to one another and then spirally wound around a spool or axle "*m*". The spool or axle of the spirally wound strips, when placed in the cold accumulator "*a*", will lie in the vertical axis thereof, as shown in Fig. 2.

The accumulator described above is of particular advantage in the regenerative refrigeration of gases for the purpose either of separating the components of a mixture of gases, or of removing the moisture or carbon dioxide therefrom. In such case, at least two cold accumulators of the type shown in Fig. 1 must be present. At the beginning of the process employing the above-described accumulator, the metallic filing or packing of the accumulator is cooled by means of a refrigerating machine to the temperature at which the particular gas mixture being treated, for example air, is to be separated into its components, or at which water vapor or carbon dioxide will precipitate from air or any other gas. The air or other gas is then introduced at the top of the first accumulator, which at this stage of the process acts as a cold exchanger, and which gives up its cold to such air and cools the same to the desired temperature. After that the air is separated into its components, or water vapor or carbon dioxide is precipitated in a suitable apparatus, after which the cold components or the cold gas is fed to a second accumlator from the bottom to the top thereof. This second accumulator now operates to store in its packing the cold of the discharging components or gas; in effect, the cold of the first accumulator is in this manner transferred to the packing of the second accumulator. The components or gases escaping from the second accumulator are almost as warm as the gas introduced into the first accumlator.

After about five minutes, the flow of gas is reversed, and the gas to be treated is fed first through the second accumulator and passed out through the first accumulator, so that it is cooled in the second and gives up its cold to the first accumulator. After about five minutes the operation is again reversed and the gas to be treated is again introduced into the first accumulator. The accumulator described above thus operates alternately as cold accumulator and cold exchanger in a regenerative refrigerating system, and is thus to be distinguished from the known forms of tubular cold exchangers which operate continuously.

I claim:

1. A cold accumulator comprising a shell, the inside space of such shell being divided into a number of zones, strips of sheet metal disposed in each of said zones and adapted to be chilled by a stream of cold gas passing through the accumulator and to cool a subsequent stream of warmer gas, said strips being disposed in such a way that from zone to zone the extent of their surface and the mass of metal toward the colder end become greater, while the total flow area of the gas channels becomes smaller.

2. A cold accumulator comprising a shell, the inside space of said shell being divided into a number of zones, disks positoned in said zones and composed of two parallel strips of sheet metal adapted to be chilled by a stream of cold gas passing through the accumulator and to cool a subsequent stream of warmer gas, said strips being wound spirally and being provided with corrugations aslant to the direction of the gas current, the corrugations of each pair of said strips lying cross-ways and contacting only at points, and said spirally wound strips being disposed in such a way that from zone to zone the mass of metal becomes greater toward the colder end.

3. A cold accumulator comprising a cylindrical shell, the inside space of said shell being divided into a number of zones lying below one another, disks positioned in said zones and composed of two parallel strips of sheet metal adapted to be chilled by a stream of cold gas passing through the accumulator and to cool a subsequent stream of warmer gas, said strips being wound spirally and provided with corrugations aslant to the direction of the gas current, the corrugations of each pair of said strips lying cross-ways and contacting only at points, and said spirally wound strips being disposed in such a way that from zone to zone the mass of metal becomes greater toward the colder end.

4. A cold accumulator comprising a shell, the inside space of said shell being divided into a number of zones, a plurality of units each composed of two parallel strips of sheet metal adapted to be chilled by a stream of cold gas passing through the accumulator and to cool a subsequent stream of warmer gas, said strips being positioned in said zones, spirally disposed and provided with corrugations aslant to the direction of the gas current, the corrugations of each pair of said strips lying cross-ways and contacting only at points, the height of said corrugations decreasing step by step towards the colder end of the accumulator and said spirally wound strips being disposed in such a way that from zone to zone the mass of metal becomes greater toward the colder end.

5. A cold accumulator comprising in combination a shell, strips of sheet metal disposed within said shell and adapted to be chilled by a stream of cold gas passing through the accumulator and to cool a subsequent stream of warmer gas, said strips being disposed in such manner that the surface and the mass of metal become greater and the total flow area of gas channels becomes smaller toward the colder end.

6. A cold accumulator comprising in combination a shell, disks composed of two parallel strips of sheet metal adapted to be chilled by a stream of cold gas passing through the accumulator and to cool a subsequent stream of warmer gas disposed within said shell, said parallel strips being wound spirally and provided with corrugations aslant to the direction of the gas current, said corrugations of each pair of said strips lying cross-ways and contacting only at points.

7. A cold accumulator comprising in combination a shell, a plurality of units each composed of two parallel strips of sheet metal adapted to be chilled by a stream of cold gas passing through the accumulator and to cool a subsequent stream of warmer gas disposed within said shell and spirally wound, said strips being provided with corrugations aslant to the direction of the gas current, the corrugations of each pair of said strips lying cross-ways contacting only at points and the height thereof decreasing towards the colder end of the accumulator.

8. A cold accumulator comprising in combination a shell, a metallic filling disposed within said shell and adapted to be chilled by a stream of cold gas passing through the accumulator and to cool a subsequent stream of warmer gas, said metallic filling being disposed in such a manner that the surface and the mass thereof are greater at the colder end of the accumulator.

9. A cold accumulator comprising a shell, a metallic filling disposed within said shell and adapted to be chilled by a stream of cold gas passing through the accumulator and to cool a subsequent stream of warmer gas, said metallic filling being disposed in such a manner that the surface and the mass thereof become gradually greater and the total flow area of the gas channels becomes gradually smaller toward the colder end of the accumulator.

10. A metallic filling for cold accumulators which comprises metallic strips disposed in such a manner that the surface and the mass of metal becomes greater and the total flow area of gas channels becomes smaller upon passing from the warm to the cold end.

11. A metallic filling for cold accumulators which comprises disks composed of two parallel strips of sheet metal wound spirally about a spool and provided with corrugations aslant towards the edges of the strips, said corrugations of each pair of said strips lying cross-ways and contacting only at points.

12. A metallic filling for cold accumulators which comprises strips of sheet metal disposed spirally and provided with corrugations aslant towards the edges of the strips, the corrugations of each pair of said strips lying cross-ways contacting only at points and the height thereof decreasing from one end to the other of the accumulator.

13. A metallic filling for cold accumulators which consists of two corrugated metal strips having corrugations running aslant towards the edges of the strips wound together spirally to form a disk in such a manner that the corrugations of each pair of adjacent sheets cross each other and contact only at points.

MATHIAS FRÄNKL.